United States Patent [19]
Wiseman et al.

[11] Patent Number: 5,825,337
[45] Date of Patent: Oct. 20, 1998

[54] COLOR AUTOSTEREOSCOPIC DISPLAY

[75] Inventors: Susan Wiseman, Cambridge; Adrian Robert Leigh Travis, South Devon, both of United Kingdom

[73] Assignee: ASD (Holdings) Ltd, Bristol, United Kingdom

[21] Appl. No.: 648,181

[22] PCT Filed: Nov. 18, 1994

[86] PCT No.: PCT/GB94/02548

§ 371 Date: Jun. 26, 1996

§ 102(e) Date: Jun. 26, 1996

[87] PCT Pub. No.: WO95/14353

PCT Pub. Date: May 26, 1995

[30]   Foreign Application Priority Data

Nov. 19, 1993  [GB]  United Kingdom .................. 9323878

[51] Int. Cl.$^6$ ........................................... G09G 5/00
[52] U.S. Cl. ................................. 345/6; 345/4; 345/151; 348/51
[58] Field of Search ............................... 345/87, 88, 150, 345/151, 1, 2, 3, 4, 5, 6, 7, 8, 9; 348/51, 52, 55, 56, 59; 359/462, 463, 466

[56]   References Cited

U.S. PATENT DOCUMENTS

| 4,758,884 | 7/1988 | Roy . | |
| 5,132,839 | 7/1992 | Travis | 359/462 |
| 5,589,980 | 12/1996 | Bass et al. | 345/9 |
| 5,638,082 | 6/1997 | Grimm | 345/6 |

FOREIGN PATENT DOCUMENTS

| 0541374 | 5/1992 | European Pat. Off. . |
| 2206763 | 11/1989 | United Kingdom . |
| 2244624 | 4/1991 | United Kingdom . |

Primary Examiner—Xiao Wu
Attorney, Agent, or Firm—Watson Cole Grindle Watson, P.L.L.C.

[57]   ABSTRACT

A polychromatic three dimensional display comprises a first (5) and second (8) image sources, the second image source (8) adapted to reduce selectively the field of view of the first image source to provide thereby a time multiplexed three dimensional autostereoscopic image. The display also comprises a switching color filter (12) disposed adjacent to the second image source which comprises a plurality of regions each switchable between different colors to enable color modulation of the generated image.

13 Claims, 7 Drawing Sheets

COLOR AUTOSTEREOSCOPIC DISPLAY

BACKGROUND OF THE INVENTION

The present invention relates to three dimensional autostereoscopic displays. Such autostereoscopic displays can be made from a high frame rate two dimensional display and a device which makes the picture on the two dimensional display visible from different directions.

To display an autostereoscopic three dimensional image, a series of views of the object to be imaged are required. These might be captured by, for example, surrounding a solid object with an array of conventional cameras.

With such systems, each view in the series is put up on the two dimensional display in turn and made visible from a particular general direction. If the series is repeated quickly enough that the human eye perceives no flicker, the apparent effect is a display whose image content will depend on from where the human eye looks. By appropriate matching of view to direction of viewability, it is possible to recreate the three dimensional image on the display.

One way of making such a display is to use a cathode ray tube as the two dimensional display, and a lens and a shutter as the device which limits the field of view of the picture on the display.

The lens forms a virtual image of the cathode ray tube. The shutter, which reduces the field of view of the image, is positioned adjacent to the lens.

If the position of the aperture in the shutter can be changed rapidly, the angle from which the image can be seen may be varied as different pictures are presented in turn for display on the CRT screen. Each picture can be the view of some scene taken from a chosen viewpoint. So long as the picture for each direction is repeated sufficiently frequently, typically at least 50 Hz, and the shutter is stepped in sequence with the view on the CRT display, then different views will be seen from different positions and a three dimensional image will be observed. There are several alternative optical and image forming arrangements that are operationally equivalent to the description given above. Implementations can consist of 2 dimensional image forming devices made from an LCD or from a CRT. The shutter can be made from an LCD. The arrangement can place the shutter between the image forming device and the observer or can position the image forming device between the shutter and the observer. The light can be collimated or non-collimated. In a presently preferred implementation, the image forming device is a CRT and a viewing lens is added between the viewer and the shutter to narrow the pencils of rays passing through the aperture into near-parallel beams.

A number of devices for producing a colour 3D display employing the above principles have been proposed. One such way of making a colour three dimensional display is to have a colour CRT. However conventional colour CRT's are not bright because they incorporate shadow masks. Since the shuttering system absorbs a lot of light the CRT in this system needs to be bright, requiring a great deal of power, and brighter than available by current masking techniques.

Another way of making a colour three dimensional display is to use dichroic mirrors to combine the images from one red, one green and one blue CRT. The problem is that, at least in current three dimensional displays, the imaging lens is large, and there is little space for dichroic mirrors. Furthermore, it becomes necessary to register the CRTs so that the position of each pixel is the same on each CRT. The whole system is bulky, heavy and expensive because three times as many components are needed.

The bulk and expense of three CRT's can be avoided by using one CRT with a white phosphor, then filtering the emitted light so that rays of each of the primary colours are transmitted in turn. The disadvantages of this approach are that the CRT needs to operate three times faster than otherwise, it needs to be brighter than otherwise, and a filter which can switch between the primary colours is required.

A filter which switches between the primary colours has been made for a colour two dimensional display. It might seem that the obvious way to make a colour three dimensional display would be to place this filter over the front of the three dimensional display. Colour images might be produced on a black/white three dimensional display by placing a filter against the front which switches through the primary colours. The problem is that the liquid crystal of which present switching colour filters are made cannot switch quickly enough.

When the filter is used on a two dimensional display the CRT displays the three primary colour components of the picture one by one. Ideally the filter should change colour in the time interval between the end of the display of one primary colour and the beginning of the display of the next. This time interval is short and even on the two dimensional display the filter is not fast enough for this purpose.

In fact the filter is divided into horizontal bands which can be switched independently. The idea is that as the CRT electron beam writes each picture from the top of the screen to the bottom, the horizontal bands of the filter are also switched one by one, from top to bottom. Provided each band begins switching immediately after lines adjacent to it have decayed, there is sufficient time to complete switching before the adjacent lines are written with new information.

This solution works for the two dimensional display, but the frame rate of the CRT in the three dimensional display is much higher. There is therefore less time before each line is rewritten, and this time is insufficient for the filter to switch.

An alternative to using a switching colour filter would be to make a wheel comprising a red, green and blue filter and spin this in front of the screen. This might work with a two dimensional display because the wheel need only spin at 60 Hz. With a three dimensional display with 8 views, for example, the wheel would have to spin at 480 Hz, this would be impractical.

The presently available switching colour filters are slow because they are based on slow-switching liquid crystals. The liquid crystals in the shutter used in the three dimensional display switch much more quickly. It has been suggested that it might be possible to configure the shutter to switch each slit through each of the primary colours in turn before closing that slit and opening the next. Colour images might be produced on a black/white three dimensional display by making the shutter filter the primary colours in turn while each slit is open. Unfortunately, shutters which work in this way are not available at present.

It is useful to consider if a pair of spinning wheels could be configured to behave like a colour-switching shutter. Such a system is discussed in "Wireless World, February 1942—Stereoscopic colour TV". In a system with a wheel with a slit spinning so as to scan the slit in the focal plane of the collimating lens, with a colour wheel placed adjacent to this slit, the colour wheel spinning at a higher rate so that at each slit position light is filtered to produce each of the primary colours.

The problem with this proposed system is that the shutter slit does not move from position to position, but is always moving. So the slit will be at a slightly different position as each of the colour filters passes it. This will produce a registration problem, there will be positions at which an eye will see, for example, the red component of one view superposed on the blue and green components of a different view. This would be quite unsatisfactory.

SUMMARY OF THE INVENTION

According to the present invention there is provided a polychromatic three dimensional display comprising:

a first image source;

a second image source, the second image source being adapted to reduce selectively the field of view of the first image source to generate thereby a time multiplexed three dimensional autostereoscopic image; and a switching colour filter disposed adjacent to the second image source and comprising a plurality of regions each switchable between different colours to enable colour modulation of the generated image.

Preferably the first image source is a spatial light modulator, and the second image source is a scanning light source which selectively illuminates the first image source from one of a plurality of positions. Alternatively, the first image source is a monochrome or white phosphor cathode ray tube or similar device, and the second image source is a shutter comprising a plurality of independently activated apertures.

Preferably, there is also provided an imaging lens positioned between the two image sources. The imaging lens may be either single or multi-element, and allows greater optical design freedom, together with the possibility of producing large images from components of reduced size.

A collimating lens may also be provided to provide a viewer with collimated light to improve the autostereoscopic effect of the display.

The filter may include a rotatable disc comprising a plurality of differently coloured regions, but is preferably comprises a plurality of regions that are individually switchable between a plurality of colours. With this latter arrangement, for displays where the second image source is a shutter, there may also be provided control means for controlling the activation of the switching colour filter strips and shutter apertures so that each strip starts switching to the next colour immediately after the termination of the view which passes light through that strip.

Preferably the colour filter has portions corresponding the three primary colours.

BRIEF DESCRIPTION OF THE DRAWINGS

One example of the present invention will now be described with reference to the accompanying drawings in which.

DESCRIPTION OF THE INVENTION

Figure 1:
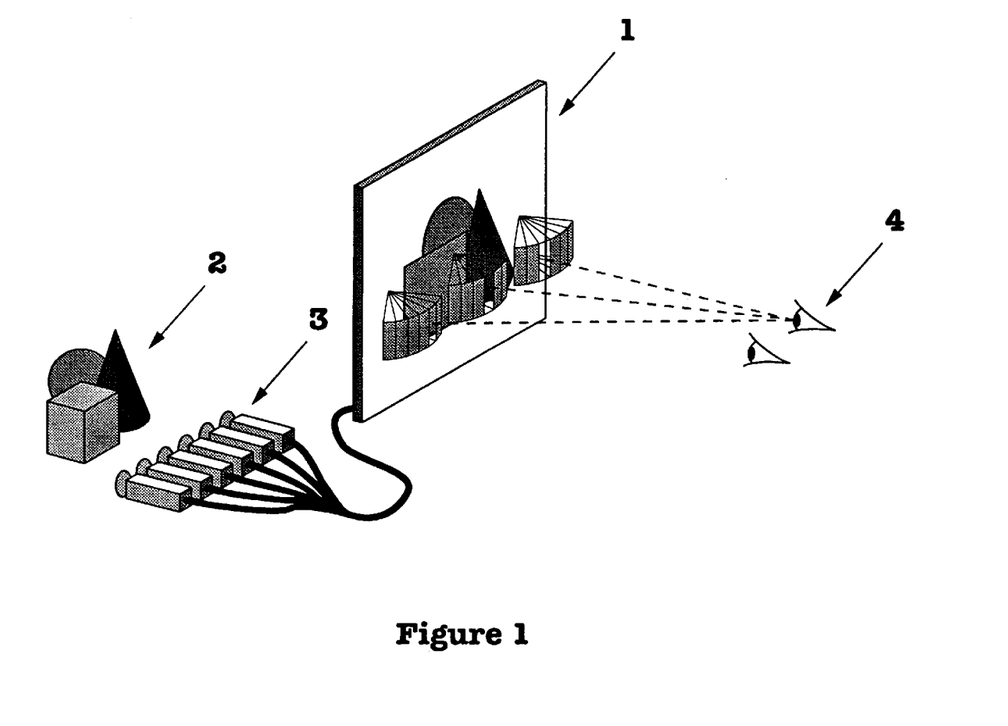
FIG. 1 is a schematic diagram showing the basic principles of an autostereoscopic three dimensional display.

FIG. 1 shows the basic concept of a known three dimensional display. Pictures of an object are formed by cameras 3 ranged round the object 2 and pointing at it from different directions. One picture at a time is reproduced on the display 1. The display 1 can confine the direction from which this picture is visible. It does this so that the direction of visibility matches the direction of the camera from which the picture is received. Other pictures are shown from other cameras 3 in a similar manner. Once a picture from each of the cameras 3 has been shown, the sequence is repeated. The rate of repetition is such that the display of each picture to each direction will appear continuous to an observer 4 inspecting the display from different angles.

Whenever collimated light illuminates the observer 4, he will see the picture on the display. However each of the observer's eyes will be illuminated by collimated light travelling in different directions. So each eye will see a different picture. The three dimensional image displayed will therefore be of the type described with reference to FIG. 1.

Figure 2:
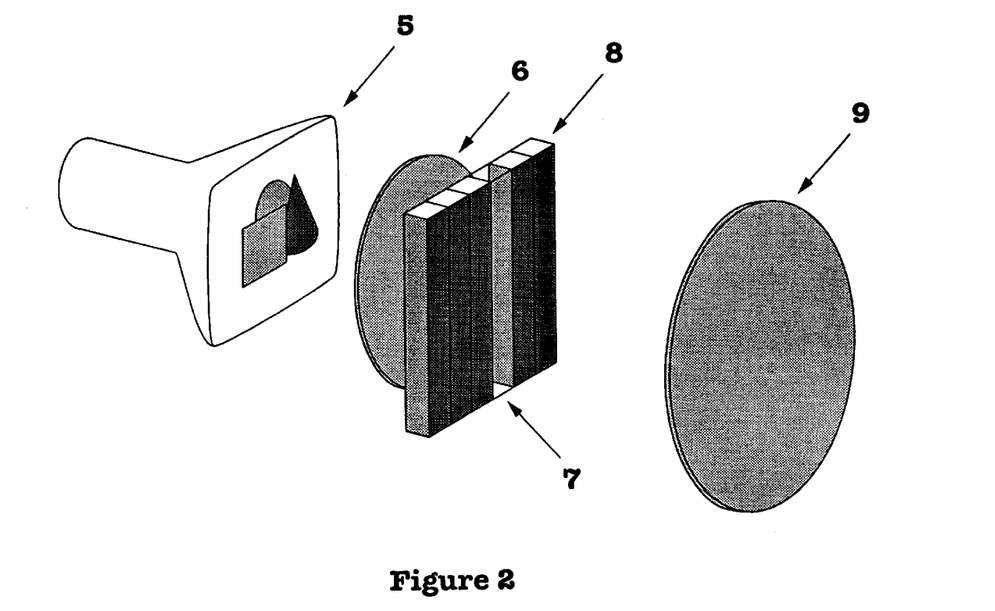
FIG. 2 is a diagram showing a prior art example of a monochrome autostereoscopic three dimensional display.

In the prior art system of FIG. 2, a cathode ray tube (CRT) 5 is used as an image source. Light from the image source 5 passes through an imaging lens 6 and an aperture 7 in a shutter 8. The shutter 8 comprises an array of independently activated apertures 7. The light then passes through a collimating lens 9 to be viewed by an observer. A different aperture 7 is opened for each of the images that are displayed on the image source 5, so that a viewer perceives each of the images to be from a source of a different position and a monochrome three dimensional display is produced.

Figure 3:
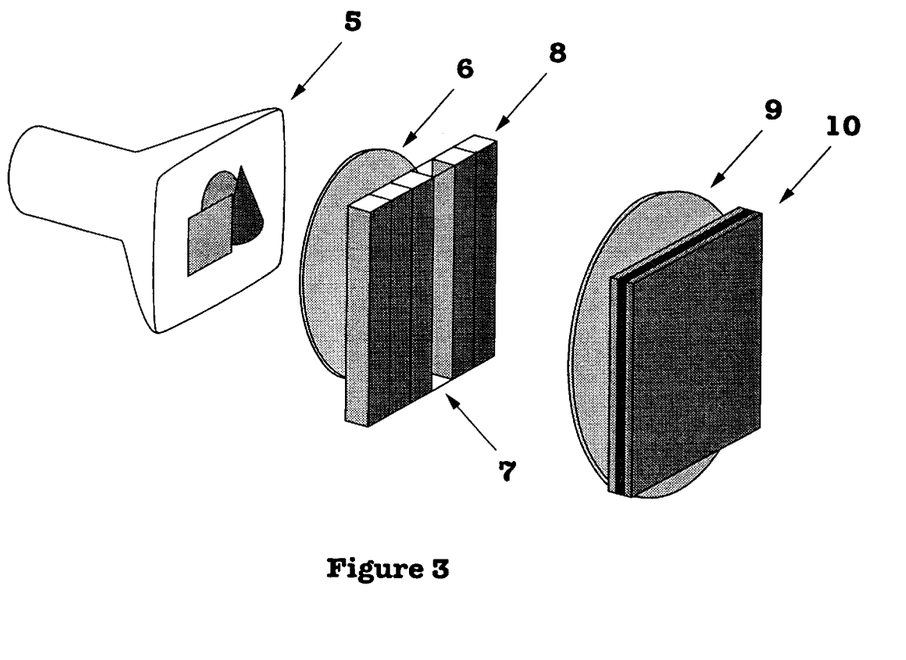
FIG. 3 is a colour adaptation of the display of FIG. 2.

FIG. 3 shows the monochrome three dimensional display of FIG. 2 adapted to be used a colour three dimensional display by the additional of a colour filter 10. The colour filter 10 switches between the three primary colours in turn, and the sequence of images displayed in the image source 5 is repeated three times, once for each of the primary colours. As mentioned above, such a system has the serious problem that a switching times of the image source 5, shutter 8 and particularly the colour filter 10 must be very small so that no flicker is observed by the viewer.

Figure 4:
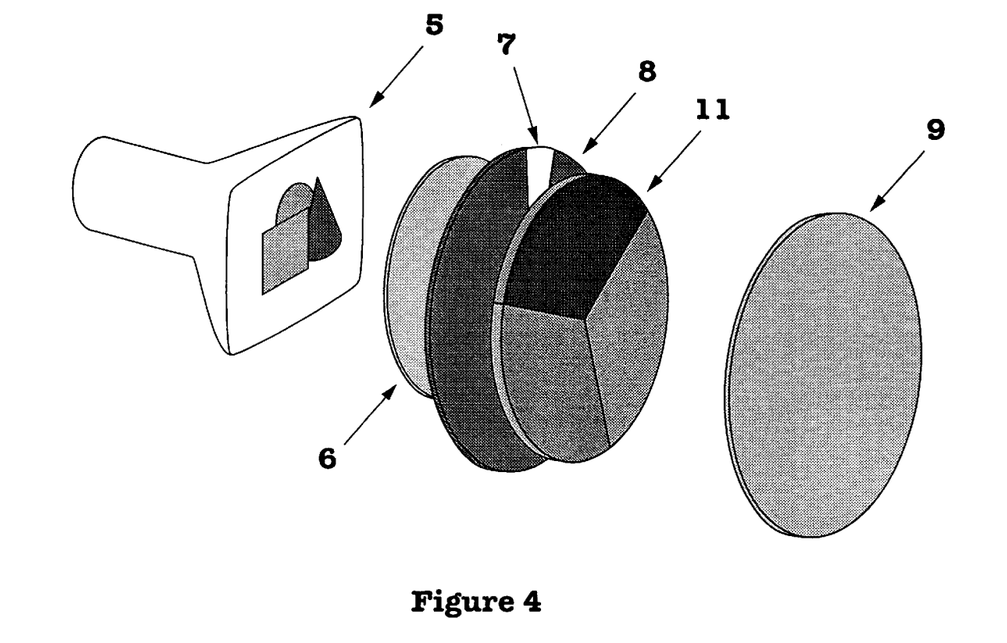
FIG. 4 is a prior art polychromatic autostereoscopic three dimensional display employing a spinning disc.

In the prior art system of FIG. 4, the moving slit shutter 8 is provided by a spinning disc, and the colour is produced by the rotation of a spinning disc 11 that is divided into three portions, each of the portions being coloured according to one of the three primary colours. In this example, the filter disc 11 is spun at high speed to produce three supposedly identical images in the three primary colours, which are perceived by an observer to be a single image of combined colour. Unfortunately, as the slit 7 is continuously moving, the three coloured images will be perceived to be coming from slightly different positions, so that they will not overlap perfectly and a full three dimensional effect will not be produced.

Figure 5:
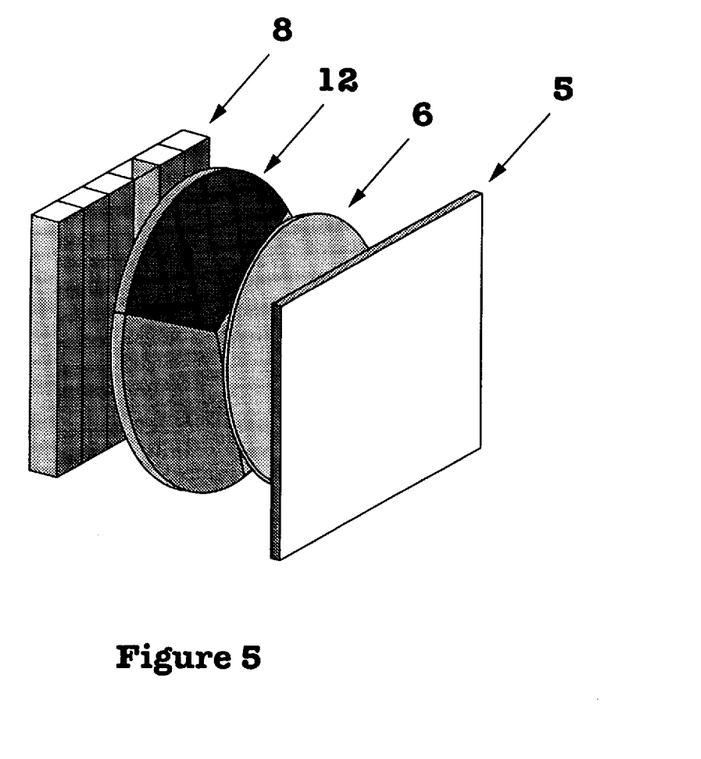
FIG. 5 is a schematic diagram of a first example autostereoscopic polychromatic three dimensional display according to the present invention.

In the first example of the present invention shown in FIG. 5, the display has a first image source 5, which is a spatial light modulator provided by a liquid crystal display or similar device. The device also includes a scanning light source 8 and spinning disk filter 12. There is also provided an imaging lens 6, which is not essential, but which provides greater component design freedom. In operation the first image source 5 displays a series of images of an object from different viewpoints, and, for each image displayed, a different portion of the light source is activated, illuminating the image from one direction and making it appear to come from a different position. As with the prior art examples, with each of the images being produced at a rate at which the eye perceives no flicker, an autostereoscopic display is produced. However, as there is provided a colour filter 12 between the light source 8 and image source 5, a series of colour modulated images will be presented to a viewer. The colour filter 12 must spin at a speed which ensures that the illuminating light is modulated to the correct colour for the image being presented, but as only one of the light sources 8 is activated at any one instant, the rotation of the colour filter 12 can follow the activation of the individual light sources 8, providing a complete series of images for a first colour, and enabling the filter 12 to have rotated to the next colour by the time that each of the sources 8 has been activated. This greatly reduces the necessary spinning speed for the filter.

Figure 6:
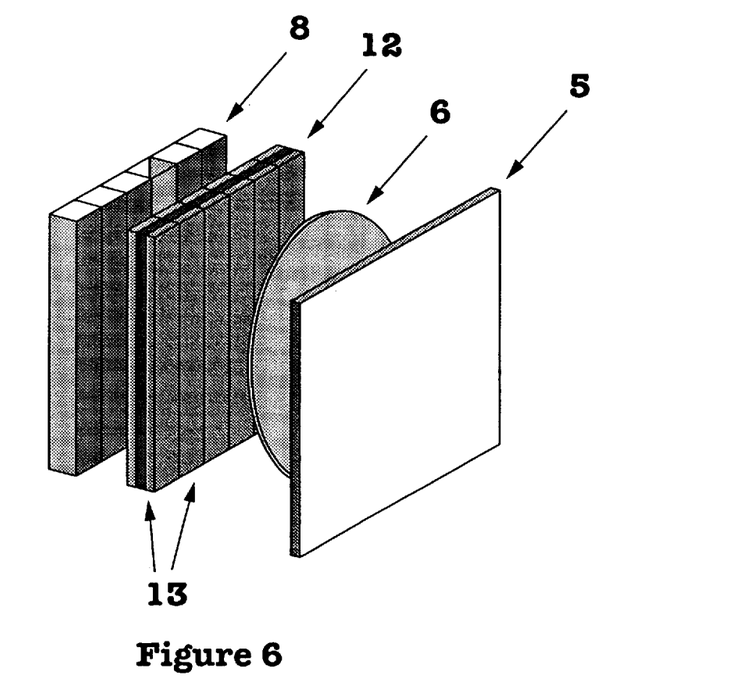
FIG. 6 is a schematic diagram of a second example autostereoscopic polychromatic three dimensional display according to the present invention.

FIG. 6 shows a second example of the present invention which employs very similar principles to that of the first example, but which, in place of the spinning colour filter 12 has a colour filter comprising a plurality of individually switchable regions 13. Each of these regions 13 can be switched between one of a number of colours, in this example red, green and blue. An example of a device with such characteristics is a NU 700S colour shutter from Tectronix Ltd. In this example, the light source 8 and image source 5 operate in a similar fashion to that of the first example, but the filter is aligned with the individual light sources. In operation, each of the regions 13 of the filter 12 is activated to change colour immediately after its corresponding light source has been de-activated, so that the time period in which each region must change to the next required colour is maximised. This enables the employment of a filter with a reduced switching speed for each of its regions.

Figure 7:
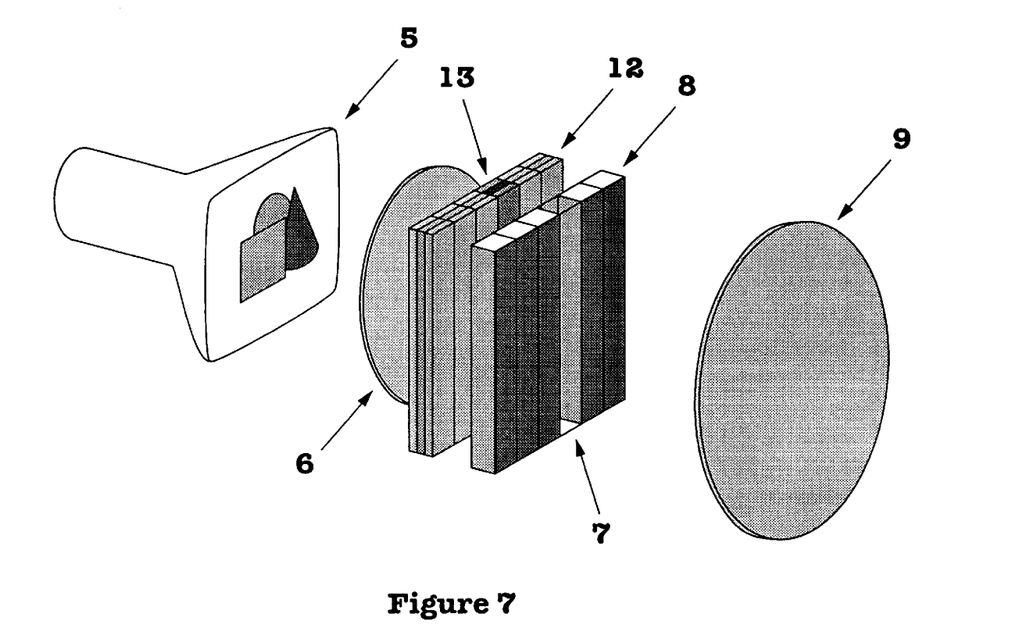
FIG. 7 is a schematic diagram of a third example autostereoscopic polychromatic three dimensional display according to the present invention.

In the example of the present invention shown in FIG. 7, a first image source 5, imaging lens 6, shutter 8 and collimating lens 9 are provided, in addition, a switching colour filter 12 is also provided. The imaging lens 6 and collimating lens 9 are not essential to the invention, but, as mentioned above, enable greater design freedom and components of reduced size to be employed. The switching colour filter 12 is positioned between the imaging lens 6 and the shutter 8 and, as with the second example, comprises an array of individually switchable regions 13, each of the regions being able to be switched between the primary colours. This example may, alternatively, employ a spinning disc filter of the type described with reference to FIG. 5, in place of the switchable strip colour filter 12.

As previously mentioned, spinning disc colour filters would normally have to be spun at great speed to be employed in an autostereoscopic display, but, with the examples of the present invention which employ such filters, this speed is greatly reduced by the employment of only a fraction of one of the coloured apertures in colour modulation at a particular instant. Also, as previously mentioned, the switching time of switchable colour filters is slow, but in the two examples of the present invention which employ such filters, this is overcome by individually switchable strips 13, which can be activated prior to their corresponding aperture 7 being opened in front of them. As each of the strips is only visible for a short period of time, a larger switching time is available for activating them and changing their colour. Different speed of switching colour and aperture can be exploited to give the combined effect on the two at the speed of the fastest, subject to a cycle time of the switching speed of the slowest. The examples of the present invention operate in a similar fashion to the device of FIG. 3, in that the image sequence is run three times on the image source 5, with each of the apertures 7 being activated in turn on the shutter 8 once for each time the sequence is played, the filter 12 being switched between colours in advance of the opening of the aperture 7 so that it has completely changed to the next colour prior to them being made visible to the viewer.

We claim:

1. A polychromatic three dimensional display comprising:

a first image source operating at a first selected rate;

a second image source switching through a repeating cycle at a second selected rate less than the first selected rate to reduce selectively the field of view of the first image source to generate thereby a time multiplexed three dimensional autostereoscopic image; and a switching colour filter operating at the second rate disposed adjacent to the second image source and comprising a plurality of regions each switchable between different colours to enable colour modulation of the generated image.

2. A display according to claim 1, wherein the first image source is a spatial light modulator, and the second image source is a scanning light source which selectively illuminates the first image source from one of a plurality of positions.

3. A display according to claim 1, wherein the first image source is a white phosphor cathode ray tube or similar device, and the second image source is a shutter comprising a plurality of individually activated apertures.

4. A display according to claim 1, wherein there is further provided an imaging lens positioned between the two image sources.

5. A display according to claim 4, wherein the imaging lens is a single element lens.

6. A display according to claim 4, wherein the imaging lens is a multi-element lens.

7. A display according to claim 1, wherein there is further provided a collimating lens to provide a viewer with collimated light.

8. A display according to claim 1, wherein the filter includes a rotatable disc having a plurality of differently coloured regions.

9. A display according to claim 1, wherein the filter comprises a plurality of regions that are individually switchable between a plurality of colours.

10. A display according to claim 9, wherein each of the regions are rectangular and adjacent to one another.

11. A display according to claim 1, wherein there is further provided control means for controlling the activation of the switching colour filter strips and shutter apertures so that each strip starts switching to the next colour immediately after the termination of the view which passes light through that strip.

12. A display according to claim 1, wherein the filter has portions corresponding to the three primary colours.

13. A display according to claim 1, wherein the first image source displays real two dimensional images.

* * * * *